United States Patent
Nagaraj et al.

(10) Patent No.: US 7,886,213 B2
(45) Date of Patent: Feb. 8, 2011

(54) METHODS AND APPARATUS FOR PROVIDING LINEAR ERASURE CODES

(75) Inventors: Thadi M. Nagaraj, San Diego, CA (US); Bruce E. Collins, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 12/787,107

(22) Filed: May 25, 2010

(65) Prior Publication Data

US 2010/0235717 A1    Sep. 16, 2010

Related U.S. Application Data (62) Division of application No. 11/373,021, filed on Mar. 9, 2006, now Pat. No. 7,752,532.

(60) Provisional application No. 60/660,875, filed on Mar. 10, 2005.

(51) Int. Cl.
*H03M 13/00*    (2006.01)

(52) U.S. Cl. ..................... 714/776
(58) Field of Classification Search ................ 714/752, 714/755, 776; 375/262, 286
See application file for complete search history.

(56) References Cited

U.S. PATENT DOCUMENTS

| | | | |
|---|---|---|---|
| 6,377,995 B2 | 4/2002 | Agraharam et al. | |
| 6,600,432 B2 | 7/2003 | Green | |
| 7,298,746 B1 | 11/2007 | De La Iglesia et al. | |
| 7,594,154 B2 * | 9/2009 | Vedantham et al. | 714/752 |

OTHER PUBLICATIONS

Roca et al., Design and Evaluation of a Low Density Generator Matrix (LDGM) Large Block FEC codec, 2003, Fifth Int. Workshop on Network Group, p. 1-12.
International Search Report- PCT/IS06/008486, International Search Authority- European Patent Office, Jun. 19, 2006.
Written Opinion- PCT/IS06/008486, International Search Authority- European Patent Office, Jun. 19, 2006.
V. Roca, Z. Khalloof, J. Laboorg: "Design and Evaluation of a Low Density Generator Matrix (LDGM) Large Block FEC Codec", Fifth International Workshop on networked group communication (NGC' 03), Sep. 2003, Munich, Germany.
Sklar B: Harris F J: "The ABC's of Linear Bock Codes" IEEE Signal Processing Magazine, Jul. 2004.

* cited by examiner

*Primary Examiner*—Shelly A Chase
(74) *Attorney, Agent, or Firm*—Gerald P. Joyce, III (57) ABSTRACT

Methods and apparatus for providing linear erasure codes. In one aspect, a method is provided for encoding a set of data values into a code symbol. The method includes determining an index sequence that defines selected data values to be used to generate the code symbol, and determining a value sequence that defines factors to be multiplied by the selected data values to generate the code symbol. The method also includes generating a packet header that describes the index sequence and the value sequence.

20 Claims, 9 Drawing Sheets

| Field Name | Field Type |
|---|---|
| CODE_WEIGHT | Uint_(8) |
| VALUE_SEQUENCE_TYPE | Uint_(4) |
| INDEX_SEQUENCE_TYPE | Uint_(4) |
| VALUE_SEQUENCE_INFO | Uint_(8) |
| INDEX_SEQUENCE_INFO | Uint_(32) |

METHODS AND APPARATUS FOR PROVIDING LINEAR ERASURE CODES

CLAIM OF PRIORITY

The present Application for Patent is a divisional of U.S. patent application Ser. No. 11/373,021, filed Mar. 9, 2006 which claims priority to U.S. Provisional Application No. 60/660,875, filed Mar. 10, 2005, and assigned to the assignee hereof and hereby expressly incorporated by reference herein.

BACKGROUND

1. Field

The present application relates generally to the operation of data networks, and more particularly, to methods and apparatus for providing linear erasure codes.

2. Background

In typical wireless delivery systems, content is delivered to portable devices over a multicast transmission channel. The content is in the form of code packets that are coded to overcome packet losses that may occur as packets are transmitted over the transmission channel. An encoder at a transmitter takes the original data packets and produces code packets that are transmitted to one or more devices. Because of noise or other degrading transmission effects, a subset of the code packets is received at any particular device. The received code packets are decoded to recover the original data packets.

Typically, the packet format for use for erasure recovery codes comprises a packet header and packet payload that contains the actual coded data. Conventional systems utilize a different packet header format for each type of erasure code that is used. Unfortunately, this approach is not flexible and does not scale well. For example, if a new encoding type is utilized, then the receivers cannot process those encoded packets without first being updated with special knowledge about how to process the packets. Furthermore, it may be desirable to combine different coding techniques in order to solve or compensate for certain transmission conditions. However, in conventional systems it is generally not possible to combine different coding schemes.

Therefore, what is needed is a system that operates to provide linear erasure encoding that is flexible, scalable, and allows new or combinations of coding schemes without requiring receiving devices to be updated with special knowledge about the encoding scheme being used.

SUMMARY

In one or more embodiments, a coding system, comprising methods and apparatus, is provided that operates to provide linear erasure coding for coding data in a communication system. For example, embodiments of the coding system operate to represent linear coding schemes in a general format that can be easily decoded by receiving devices without having special knowledge of the coding scheme being used. As a result, the coding system allows for the combination of a variety of code types to solve any transmission condition.

In one aspect, a method is provided for encoding a set of data values into a code symbol. The method comprises determining an index sequence that defines selected data values to be used to generate the code symbol, and determining a value sequence that defines factors to be multiplied by the selected data values to generate the code symbol. The method also comprises generating a packet header that describes the index sequence and the value sequence.

In one aspect, an apparatus is provided for encoding a set of data values into a code symbol. The apparatus comprises encoding logic configured to determine an index sequence that defines selected data values to be used to generate the code symbol and to determine a value sequence that defines factors to be multiplied by the selected data values to generate the code symbol. The apparatus also comprises output logic configured to generate a packet header that describes the index sequence and value sequence.

In one aspect, an apparatus for encoding a set of data values into a code symbol. The apparatus comprises means for determining an index sequence that defines selected data values to be used to generate the code symbol, and means for determining a value sequence that defines factors to be multiplied by the selected data values to generate the code symbol. The apparatus also comprises means for generating a packet header that describes the index sequence and the value sequence.

In one aspect, a computer-readable medium is provided that has a computer program, which when executed by at least one processor, operates to encode a set of data values into a code symbol. The computer program comprises instructions for determining an index sequence that defines selected data values to be used to generate the code symbol, and instructions for determining a value sequence that defines factors to be multiplied by the selected data values to generate the code symbol. The computer program also comprises instructions for generating a packet header that describes the index sequence and the value sequence.

In one aspect, at least one processor is provided that is configured to perform a method for encoding a set of data values into a code symbol. The method comprises determining an index sequence that defines selected data values to be used to generate the code symbol, and determining a value sequence that defines factors to be multiplied by the selected data values to generate the code symbol. The method also comprises generating a packet header that describes the index sequence and the value sequence.

In one aspect, a method is provided for decoding a code packet into a set of data values. The method comprises obtaining a packet header and a packet payload from the code packet, and determining an index sequence and a value sequence from the packet header. The method also comprises decoding the packet payload based on the index sequence and the value sequence to produce the set of data values.

In one aspect, an apparatus is provided for decoding a code packet into a set of data values. The apparatus comprises extraction logic configured to obtain a packet header and a packet payload from the code packet, and index sequence logic configured to determine an index sequence from the packet header. The apparatus also comprises value sequence logic configured to determine a value sequence from the packet header, and decoding logic configured to decode the packet payload based on the index sequence and the value sequence to produce the set of data values.

In one aspect, an apparatus is provided for decoding a code packet into a set of data values. The apparatus comprises means for obtaining a packet header and a packet payload from the code packet, and means for determining an index sequence and a value sequence from the packet header. The apparatus also comprises means for decoding the packet payload based on the index sequence and the value sequence to produce the set of data values.

In one aspect, a computer-readable medium is provided that has a computer program, which when executed by at least one processor, operates to decode a code packet to produce a set of data values. The computer program comprises instructions for obtaining a packet header and a packet payload from the code packet, and instructions for determining an index sequence and a value sequence from the packet header. The computer program also comprises instructions for decoding the packet payload based on the index sequence and the value sequence to produce the set of data values.

In one aspect, at least one processor is provided that is configured to perform a method for decoding a code packet into a set of data values. The method comprises obtaining a packet header and a packet payload from the code packet, and determining an index sequence and a value sequence from the packet header. The method also comprises decoding the packet payload based on the index sequence and the value sequence to produce the set of data values.

Other aspects of the embodiments will become apparent after review of the hereinafter set forth Brief Description of the Drawings, Description, and the Claims.

BRIEF DESCRIPTION OF THE DRAWINGS

The foregoing aspects of the embodiments described herein will become more readily apparent by reference to the following detailed description when taken in conjunction with the accompanying drawings wherein.

DESCRIPTION

In one or more embodiments, a coding system is provided that operates to represent linear coding schemes in a general format that can be easily decoded by receiving devices without having special knowledge of the coding scheme being used. For example, the system is suitable to encode data for transmission over a wireless communication network. The system is especially well suited for use in wireless network environments, but may be used in any type of network environment, including but not limited to, communication networks, public networks, such as the Internet, private networks, such as virtual private networks (VPN), local area networks, wide area networks, long haul networks, or any other type of data network.

Figure 1:
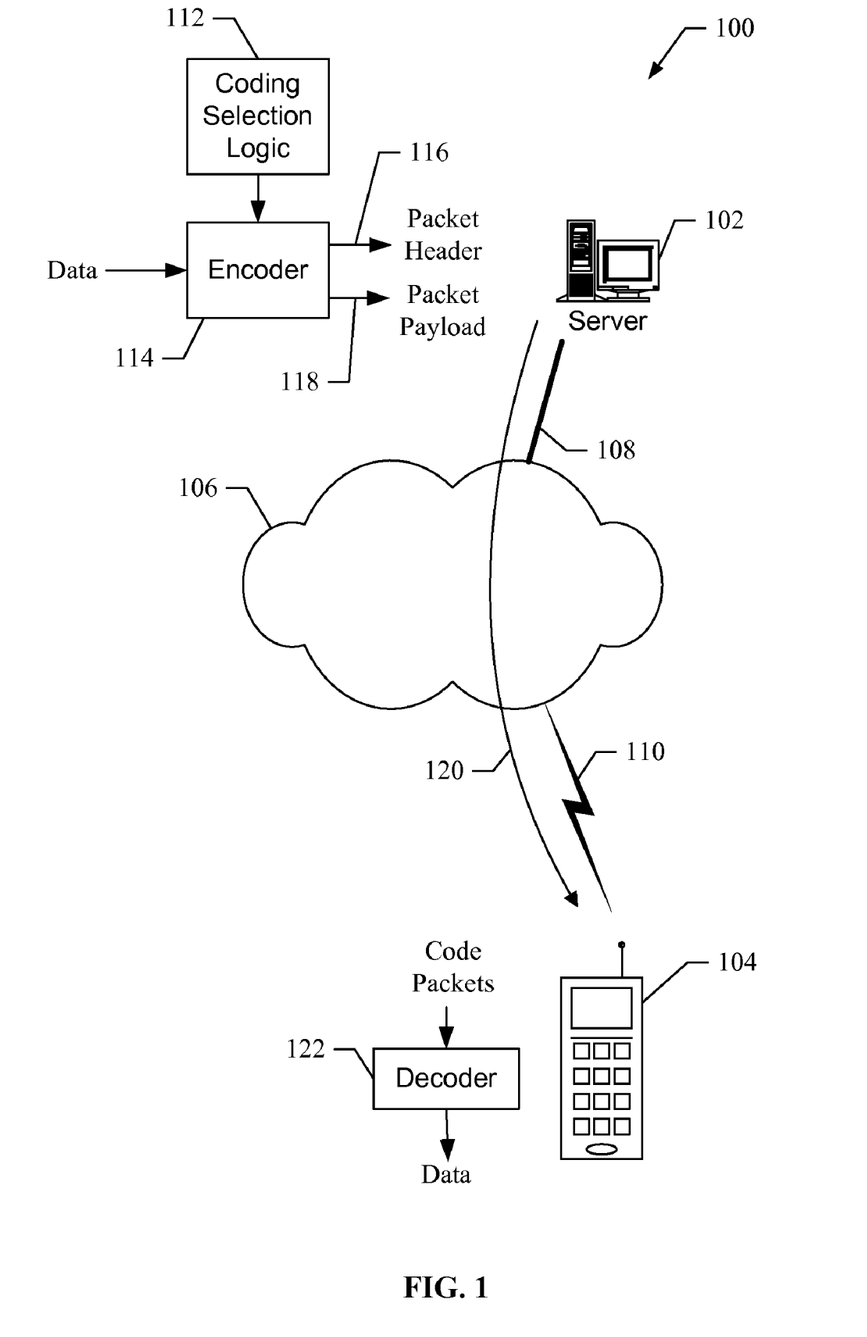
FIG. 1 shows a network that comprises one embodiment of a coding system.

FIG. 1 shows a network 100 that comprises one embodiment of a coding system. The network 100 comprises a server 102 that is in communication with a device 104 utilizing a data network 106. In one embodiment, the server 102 operates to communicate with the network 106 using any type of communication link 108. The network 106 may be any type of wired and/or wireless network. The network 106 communicates with the device 104 using any suitable type of wireless communication link 110. The server 102 operates to transmit content and/or services to the device 104. Although only one device is shown, the system is suitable for use with any number or types of devices.

In one embodiment, the server 102 comprises coding selection logic 112 that operates to select a coding type based on any selected network characteristic. For example, the coding selection logic 112 may operate to monitor various transmission or traffic conditions of the network 106 and select a coding type based on those conditions. For example, the network may be experiencing lossy transmission conditions due to signal fading or other degrading effects. The coding selection logic 112 operates to detect these transmission conditions (or is provided this information by another entity) and based on this information provides coding selection parameters to an encoder 114.

The encoder 114 operates to receive data for transmission over the network 106 and encode this data to produce code packets. In one embodiment, the encoder 114 encodes the data using one or more linear erasure codes so that when the generated code packets are transmitted over the network 106 it will be possible for a receiving device to recover lost code packets. In one embodiment, the encoder 114 operates to select an encoding scheme based on the coding selection parameters received from the coding selection logic 112.

In one embodiment, the encoder 114 operates to encode data to produce a code packet that comprises a packet header 116 and packet payload 118. The packet header 116 provides information about the linear erasure code used to encode the data. The payload 118 comprises the encoded data. A more detailed description of the operation of the encoder 114 is provided in another section of this document.

In one or more embodiments, the encoder 114 operates to encode the data using any type of linear encoding scheme. The packet header 116 is generated to fully describe whatever encoding scheme is utilized. Thus, the packet header can convey that the data was encoded using Reed-Solomon coding, LDPC coding, LDGM coding, Repetition coding, Turbo coding or any other type of linear coding scheme. The encoder 114 is also operable to encoding data using any combination of the above coding schemes or any new type of linear encoding scheme, and the packet header 116 is able to fully describe the encoding scheme used. This allows encoding schemes to be selected based on various network conditions to provide a flexible coding system. Furthermore, since the packet header fully describes the coding scheme used, the system is scalable since new coding schemes may be utilized without having to update receiving devices in order for them to process received code packets. This allows the sender to effectively combine different coding schemes or use new coding schemes to take advantage of their properties without having to update receiving devices.

After code packets are generated by the encoder 114, they are transmitted to the device 104 over the network 106 as shown by path 120. When the device 104 receives the code packets, it uses its decoder 122 to decode the packet header 116 to determine how the data was encoded. The decoder 122 then decodes the code packets to obtain the data by reversing the coding scheme described by the packet header 116. Thus, the device 104 does not need any special knowledge about the encoding scheme used because the packet header 116 provides all the information that is necessary to decode the received code packets.

Therefore, embodiments of the coding system operate to flexibly and scalably encode data for transmission over a network. It should be noted that the network 100 is just one implementation and that other implementations are possible within the scope of the embodiments.

Figure 2:
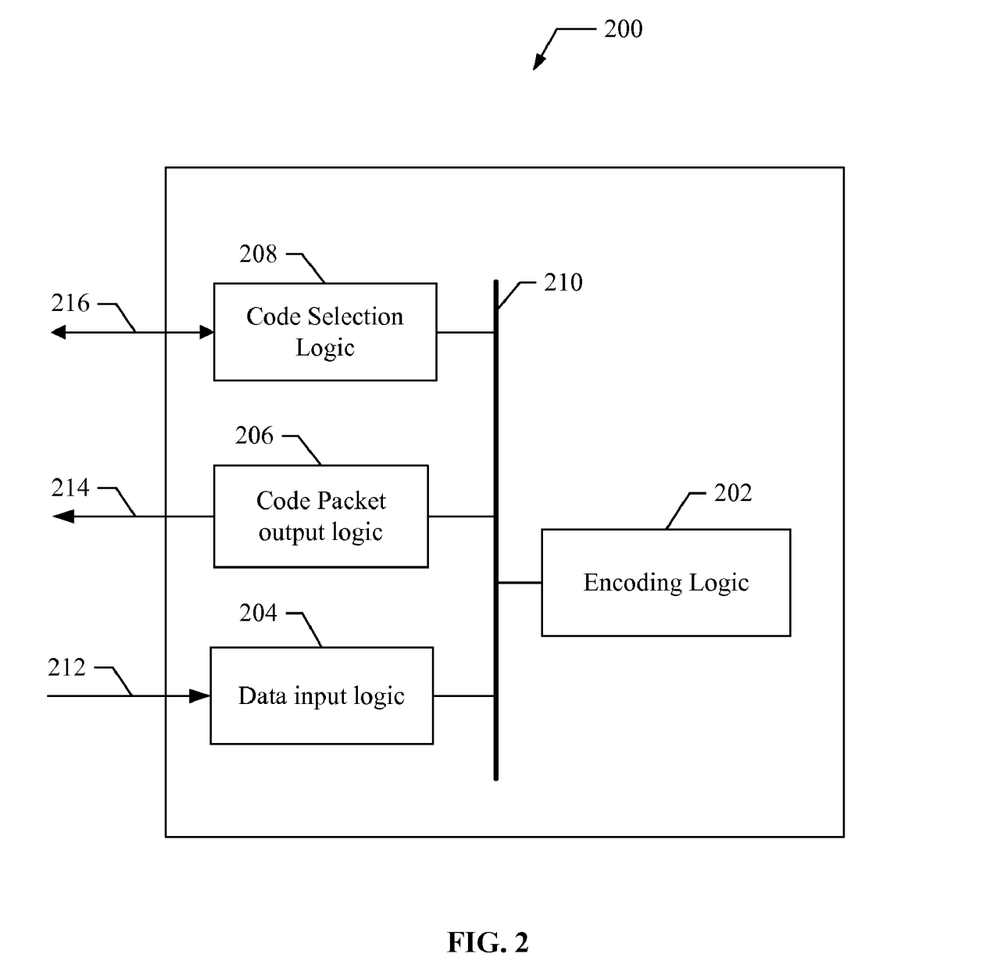
FIG. 2 shows one embodiment of an encoder for use in embodiments of a coding system.

FIG. 2 shows one embodiment of an encoder 200 for use in embodiments of a coding system. For example, the encoder 200 is suitable for use as the encoder 114 shown in FIG. 1. The encoder 200 comprises encoding logic 202, data input logic 240, code packet output logic 206, and coding selection logic 208 that are all coupled to an internal data bus 210.

The data input logic 204 comprises hardware logic and/or software that operate to allow the encoder 200 to receive data to be encoded. For example, in one embodiment, data input logic 204 operates to receive data through a data channel 212 that comprises any suitable type of communication channel 214 to allow the data input logic 204 to receive data to be encoded.

In one or more embodiments, the encoding logic 202 comprises a CPU, processor, gate array, hardware logic, memory elements, virtual machine, software, and/or any combination of hardware and software. In one embodiment, the encoding logic 202 operates to encode received data using a selected linear erasure code. A more detailed discussion of the encoding logic 202 is provided in another section of this document. Thus, the encoding logic 202 generally comprises logic to encode data and to control one or more other functional elements of the encoder 200 via the internal data bus 210.

The code packet output logic 206 comprises logic configured to output code packets for transmission over a network. For example, once data is encoded by the encoding logic 202, code packets comprising a packet header and packet payload are provided to the output logic 206. The output logic 206 then outputs the code packets to transmission logic (not shown) using the communication link 214.

The coding selection logic 208 comprises hardware and/or software configured to detect or receive encoding selection parameters, such as network performance parameters. These parameters are input to the encoding logic 202, which uses them to select an encoding scheme with which to encode the data.

During operation of one or more embodiments, the data input logic 204 receives data to be encoded for transmission. The coding selection logic 208 receives coding selection parameters that are used to determine an encoding scheme used by the encoding logic 202 to encode the data. The encoding logic 202 encodes the data according to the determined encoding scheme to produce encoded data and a packet header that describes the encoding scheme. Encoded packets comprising the packet header and payload are then output by the code packet output logic 206.

In one embodiment, the coding system comprises one or more program instructions ("program instructions") stored on a computer-readable medium, which when executed by at least one processor, for instance, the encoding logic 202, provides the functions described herein. For example, the program instructions may be loaded into the encoder 200 from a computer-readable medium, such as a floppy disk, CDROM, memory card, FLASH memory device, RAM, ROM, or any other type of memory device or computer-readable medium that interfaces to the encoder 200. In another embodiment, the instructions may be downloaded into the encoder 200 from an external device or network resource. The program instructions, when executed by the encoding logic 202, provide embodiments of a coding system as described herein.

As a result, embodiments of the coding system operate to receive data and encode the data using a selected linear erasure scheme to produce code packets for transmission over a lossy transmission channel. Thus, embodiments of the coding system operate to provide a flexible and scalable coding system because the packet header describes the coding scheme for receiving devices. Thus, the receiving devices are able to decode any scheme that may be utilized by reversing the coding scheme described by the packet header.

Encoding Logic Operation

The following is a detailed description of the operation of one embodiment of the encoding logic 202.

Figure 3:
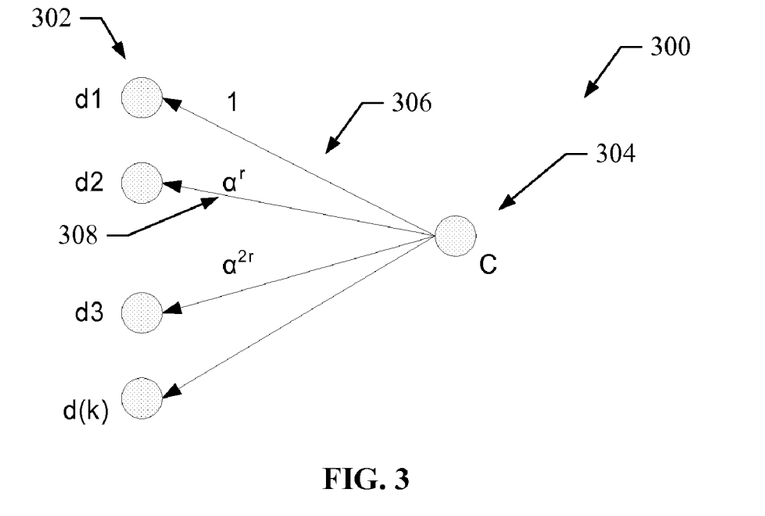
FIG. 3 shows a graphical representation that illustrates how a linear code operates to generate a code symbol in embodiments of a coding system.

FIG. 3 shows a graphical representation 300 that illustrates how a linear code operates to generate a code symbol in embodiments of a coding system. All linear code symbols are linear combinations of data symbols. The nodes on the left represent the data symbols 302 and the node on the right is a code symbol 304. An edge 306 is drawn from the code symbol 304 to one of the data symbols 302 if that data symbol is to be used to generate the code symbol 304. Associated with each edge is a label (or value) that represents a factor that is multiplied by the data symbol to become part of the code symbol. For example, the edge 306 has a label $\alpha'$ which is the factor multiplying the data symbol $d_2$, which will then be used to generate the code symbol 304.

In one or more embodiments, any linear code symbol can be represented by two sequences, namely; a value sequence (VALUE_SEQUENCE) and an index sequence (INDEX_SEQUENCE). The VALUE_SEQUENCE specifies a sequence of labels (or factors) associated with the edges. The INDEX_SEQUENCE specifies the data indices that are picked to generate the code symbol. In the graphical representation 300, the INDEX_SEQUENCE comprises a sequence of integers from 1 thru k.

The number of edges leaving a code symbol is called the code weight (CODE_WEIGHT). In the graphical representation 300, the CODE_WEIGHT is equal to k because there are k edges leaving the code symbol 304.

Example Codes

The following is a description of several coding techniques that may be provided by embodiments of the coding system. It should be noted that the examples below illustrate some, but not all, of the linear codes that can be provided by embodiments of the coding system.

1. Reed-Solomon (RS) Code

In one or more embodiments, the coding system is operable to encode data using RS coding. For example, the encoding logic 202 operates to provide RS coding as follows.

A RS code symbol C can be written as;

$$C = \sum_{i=1}^{k} (\alpha^r)^i d_i$$

where k is the number of data symbols used to generate a code symbol C, $d_i$ are the data symbols, r is a code parameter, and $\alpha$ is a primitive element of an appropriate Galois Field (GF). It will be assumed for this description that GF(256) is used for codes of interest.

In this embodiment, the INDEX_SEQUENCE comprises the values of k that represent the edges leaving the code symbol C. The VALUE_SEQUENCE comprises the values of $\alpha^r$ which are the factors multiplying the data symbols associated with each edge leaving the code symbol C. The CODE_WEIGHT is equal to the total number of edges (k) that leave the code symbol C.

Therefore, the encoding logic 202 operates to encode data according to the above equation and generates the associated CODE_WEIGHT, VALUE_SEQUENCE, and INDEX_SEQUENCE parameters. These parameters are then incorporated into a packet header as described in another section of this document.

2. Low Density Generator Matrix code

In one or more embodiments, the coding system is operable to encode data using Low Density Generator Matrix (LDGM) coding. For example, LDGM codes may be generated in the following manner. A CODE_WEIGHT is picked using some function. A number of data symbols totaling the CODE_WEIGHT are picked from all the data symbols. An example of how this is done is to initialize a data symbol number generator with an initial seed value (SEED). The data symbol number generator is then invoked CODE_WEIGHT times to generate numbers that are used to identify the data symbols. These data symbols are then combined using an exclusive-or (XOR) operation. As a linear operation, XOR is the same as addition in the Galois Field GF(256) and the multiplying factor is 1.

Therefore, as a result of the operation of the encoding system, a VALUE_SEQUENCE is generated to provide LDGM coding where the multiplying factor for all edges is a constant (1). The INDEX_SEQUENCE is generated by the operation of the data symbol number generator where each index is based on a particular output of the data symbol number generator and is associated with a particular edge.

In one embodiment, the encoding logic 202 operates to encode data according to the above description and generates the associated CODE_WEIGHT, VALUE_SEQUENCE, and INDEX_SEQUENCE parameters. These parameters are then incorporated into a packet header as described in another section of this document.

3. Repetition Code Example

In one or more embodiments, the coding system is operable to encode data using repetition coding where the data symbols are repeated in a round-robin fashion. In this case, the CODE_WEIGHT is 1 for all the code symbols. The VALUE_SEQUENCE is a constant (1), and the INDEX_SEQUENCE has only one entry and that is the index of the data symbol.

In one embodiment, the encoding logic 202 operates to encode data according to the above description and generates the associated CODE_WEIGHT, VALUE_SEQUENCE, and INDEX_SEQUENCE parameters. These parameters are then incorporated into a packet header as described in another section of this document.

Thus, the coding system is operable to generate the CODE_WEIGHT, VALUE_SEQUENCE, and INDEX_SEQUENCE parameters to provide virtually any type of linear coding. It should be noted that the coding system is not limited to the above coding schemes and that it is also possible implement other coding schemes and to combine one or more coding schemes to linearly encode data. In this case the encoding logic 202 operates to generate the corresponding CODE_WEIGHT, VALUE_SEQUENCE, and INDEX_SEQUENCE parameters that are then included into the packet header.

Packet Header Generation

In one or more embodiments, the coding system operates to generate a packet header that describes how a set of data symbols are linearly coded to produce a code symbol. For example, the encoding logic 202 operates to encode data according to any linear encoding scheme and generate the corresponding packet header as described below. The generated packet header can then be attached to the code symbols (payload) to form a code packet that is transmitted over a wireless transmission channel. Any receiving device can then decode the packet header to determine the coding process and undue that process to recover the data from the coded symbols.

Figure 4:
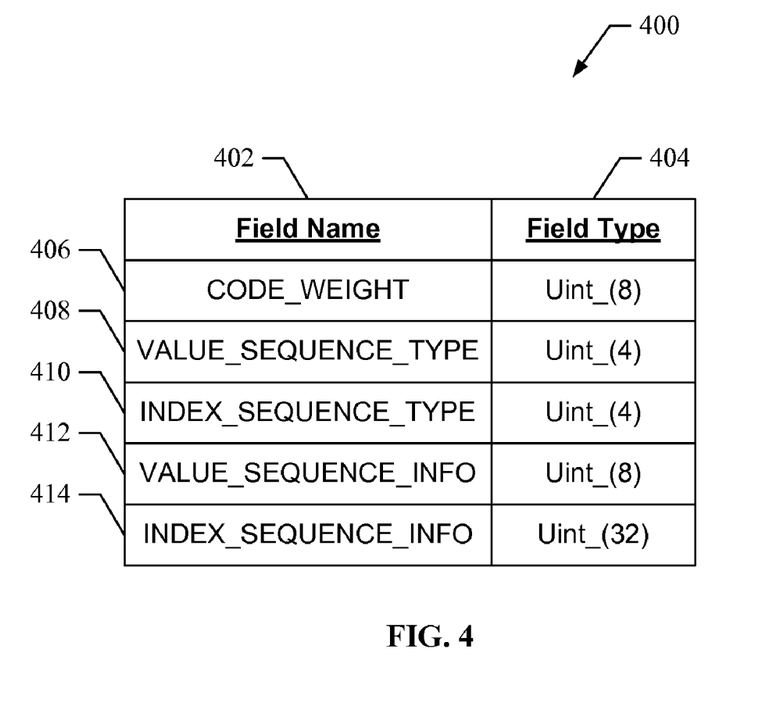
FIG. 4 shows one embodiment of a packet header for use in embodiments of a coding system.

FIG. 4 shows one embodiment of a packet header 400 for use in embodiments of a coding system. For example, in one embodiment, the packet header 400 is generated by the operation of the encoding logic 202. The packet header 400 comprises a table that includes field names 402 and associated field types 404.

In one embodiment, the field names 402 comprise CODE_WEIGHT 406, VALUE_SEQUENCE_TYPE 408, INDEX_SEQUENCE_TYPE 410, VALUE_SEQUENCE_INFO 412, and INDEX_SEQUENCE_INFO 414 parameters. The field type 404 comprises a parameter of a selected size associated with a particular field name 404. A more detailed description of the various field names is provided below.

Figure 5:
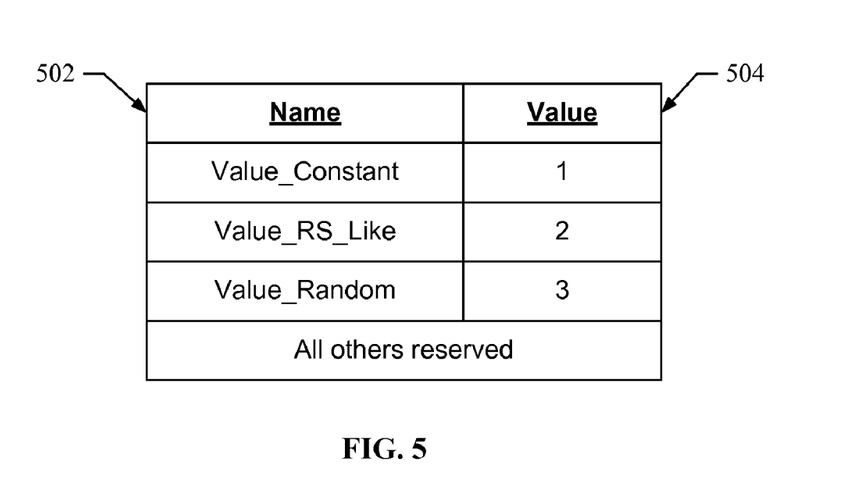
FIG. 5 shows one embodiment of a table that illustrates VALUE_SEQUENCE_TYPES for use in embodiments of a coding system.

FIG. 5 shows one embodiment of a table 500 that illustrates VALUE_SEQUENCE_TYPES for use in embodiments of a coding system. For example, parameters shown in table 500 may be used for the VALUE_SEQUENCE_TYPE 408 shown in FIG. 4. Furthermore, each of the VALUE_SEQUENCE_TYPES shown in table 500 is associated with selected VALUE_SEQUENCE_INFO 412 parameters.

The table 500 comprises a name field 502 and an associated value field 504. The name field 502 comprises names for different VALUE_SEQUENCE_TYPES and each of those is associated with a particular value in the value field 504. The following is a description of the different VALUE_SEQUENCE_TYPES and associated VALUE_SEQUENCE_INFO 412 parameters.

VALUE_CONSTANT

If the VALUE_SEQUENCE_TYPE field 408 is set to VALUE_CONSTANT (i.e., 1), then the VALUE_SEQUENCE_INFO field 412 is set to the constant value to be used. For example, if all the edge values are set to be set 1, then the VALUE_SEQUENCE_INFO field is set to a value of 1.

VALUE_RS_LIKE

If the VALUE_SEQUENCE_TYPE field 408 is set to VALUE_RS_LIKE (i.e., 2), then the VALUE_SEQUENCE_INFO field 412 is set to "r" such that $\alpha^r \in$ GF(256) is the generator of the Reed-Solomon code word.

VALUE_RANDOM

If the VALUE_SEQUENCE_TYPE field 408 is set to VALUE_RANDOM (i.e., 3), then the VALUE_SEQUENCE_INFO field 412 is set to the seed value used to initialize the random number generator that generates the sequence values. It is assumed that the random number generator used by a receiving device is the same as the random number generator used by the encoding logic 202.

Figure 6:
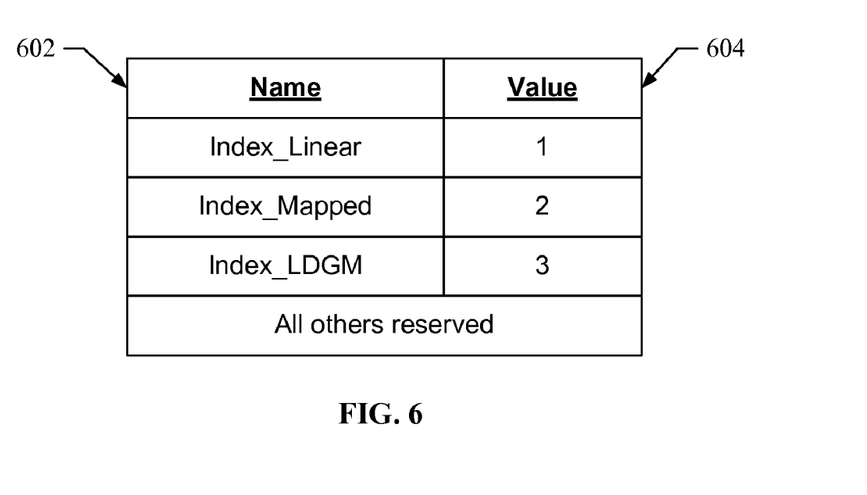
FIG. 6 shows one embodiment of a table that illustrates INDEX_SEQUENCE_TYPES for use in embodiments of a coding system.

FIG. 6 shows one embodiment of a table 600 that illustrates INDEX_SEQUENCE_TYPES for use in embodiments of a coding system. For example, parameters shown in table 600 may be used for the INDEX_SEQUENCE_TYPE 410 shown in FIG. 4. Furthermore, each of the INDEX_SEQUENCE_

TYPES shown in table 600 is associated with selected INDEX_SEQUENCE_INFO 414 parameters.

The table 600 comprises a name field 602 and an associated value field 604. The name field 602 comprises names for different INDEX_SEQUENCE_TYPES and each of those is associated with a particular value in the value field 604. The following is a description of the different INDEX_SEQUENCE_TYPES and associated INDEX_SEQUENCE_INFO 414 parameters.

INDEX_LINEAR

If the INDEX_SEQUENCE_TYPE field 410 is set to INDEX_LINEAR, (i.e., 1) then the INDEX_SEQUENCE_INFO field 414 comprises one of the following parameters.

a. INDEX_INITIAL

The INDEX_INITIAL parameter is the index of the first data packet used to generate the code packet.

b. INDEX_STEP

The INDEX_STEP parameter is the index step size used to generate the code packet. The set of indices used to generate the code packet can be expressed as follows.

$$(INDEX\_INITIAL + i * INDEX\_STEP) \mathrm{modulo}(k), i=0, 1, \ldots, CODE\_WEIGHT-1$$

INDEX_MAPPED

If the INDEX_SEQUENCE_TYPE field 410 is set to INDEX_MAPPED (i.e., 2), then each edge has a unique edge index and edge indices are mapped into data packet indices. The INDEX_SEQUENCE_INFO field 414 comprises an INITIAL_EDGE_INDEX parameter.

The INITIAL_EDGE_INDEX parameter is the index of the first edge of the code packet. The edge indices are calculated as follows.

$$(INITIAL\_EDGE\_INDEX + i), i=0, 1, \ldots, CODE\_WEIGHT-1$$

and the data index is some function (map) of the edge index. It is assumed that the same mapping function is used by the receiving device and the encoding logic 202.

INDEX_LDGM

If the INDEX_SEQUENCE_TYPE field 410 is set to INDEX_LDGM (i.e., 3), the INDEX_SEQUENCE_INFO field 414 comprises an INITIAL_SEED parameter.

The INITIAL_SEED parameter is the value used to initialize the data symbol number generator to generate the index sequence. It is assumed that the data symbol number generator used by the receiving device is the same as that used by the encoding logic 202.

Thus, embodiments of the coding system operate to encode data using virtually any linear code and to generate a packet header that describes the linear coding that was used.

Figure 7:
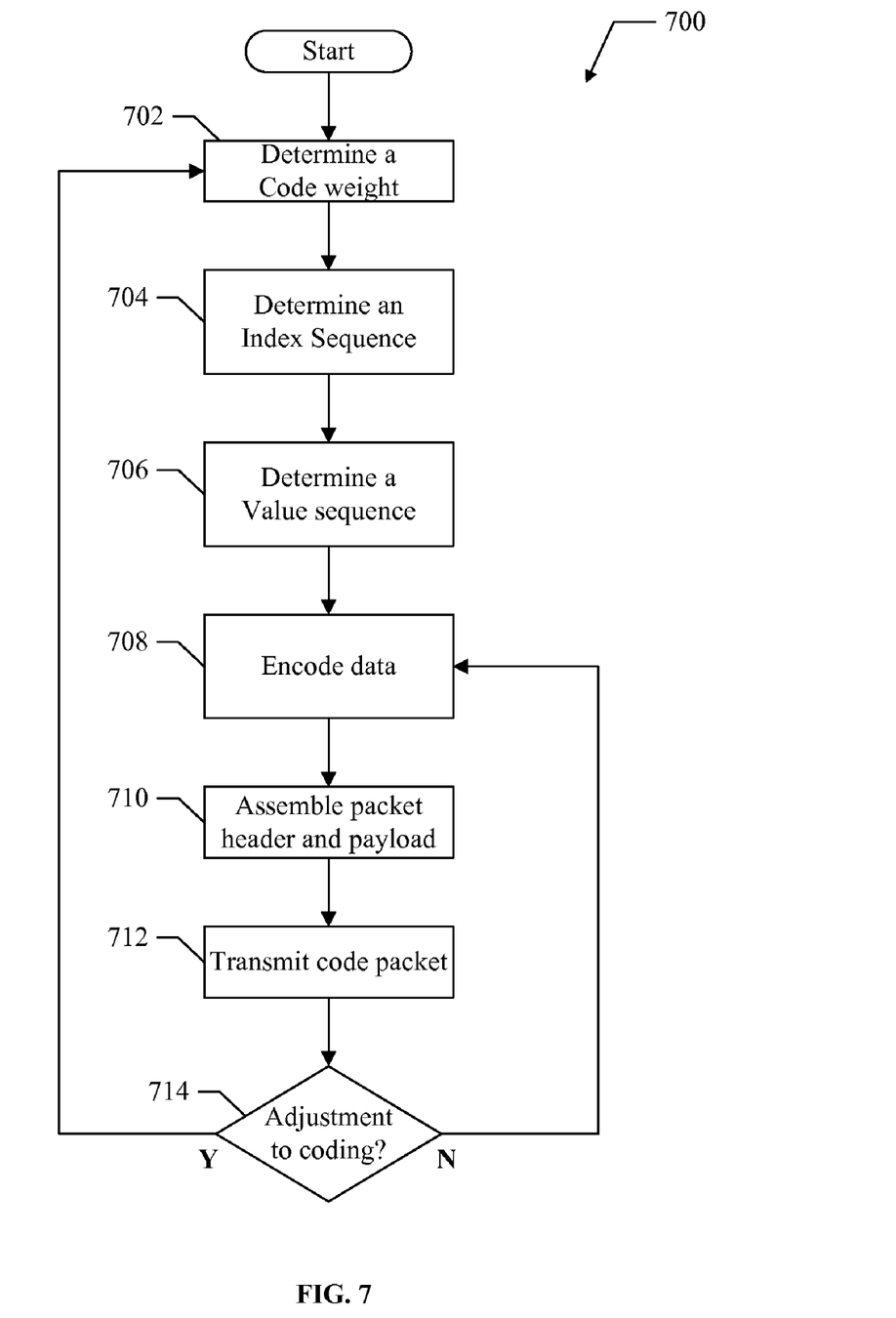
FIG. 7 shows one embodiment of a method for operating an encoder for use in embodiments of a coding system.

FIG. 7 shows one embodiment of a method 700 for operating an encoder for use in embodiments of a coding system. For clarity, the method 700 is described herein with reference to the encoder 200 shown in FIG. 2. For example, in one embodiment, the encoding logic 202 executes machine-readable instructions to perform the functions described below.

At block 702, a code weight value is determined. For example, the encoding logic 202 determines a code weight value to provide a selected type of linear coding with which to encode data. For example, the code weight value describes how many edge structures are output from a code symbol.

At block 704, an index sequence is determined. In one embodiment, the encoding logic 202 determines an index sequence that describes what data values will be used to generate a code symbol. For example, the total number of index sequence values is equal to the code weight value. In one embodiment, the index sequence is described by index sequence type (410) and index sequence info (414) parameters as described above.

At block 706, a value sequence is determined. In one embodiment, the encoding logic 202 determines a value sequence that describes factors that will be multiplied by the data values to generate a code symbol. For example, the total number of value sequence values is equal to the code weight value. In one embodiment, the value sequence is described by value sequence type (408) and value sequence info (412) parameters as described above.

At block 708, the data is encoded according to the selected coding scheme. For example, the encoding logic 202 operates to encode the data and generate a packet header that describes how the data was encoded. For example, the packet header is as shown in FIG. 4.

At block 710, a code packet is assembled that comprises a packet header and payload. For example, the code packet output logic 206 operates to generate a code packet that comprises the packet header and encoded data as a payload.

At block 712, the code packet is transmitted to one or more receiving devices. For example, the code packet output logic 206 outputs the code packet to transmission logic that operates to transmit the code packet over a wireless network to one or more devices.

At block 714, a test is performed to determine if any adjustments to the coding scheme need to be performed. In one embodiment, the code selection logic 208 operates to determine a coding scheme based on one or more network characteristics, such as network transmission or traffic characteristics. The code selection logic 208 then provides code selection parameters to the encoding logic 202 that operate to define a particular coding scheme to be used to encode the data. The code selection parameters may be in any format and may specify a coding scheme using any type of code identifiers.

If there are no adjustments to the current coding scheme, then the method proceeds to block 708 to continue coding data for transmission. If there are adjustments to the coding scheme, then the method proceeds to block 702 where new coding factors are determined so that the encoding of the data can be adjusted to accommodate selected network characteristics.

Thus, the method 700 operates to provide one embodiment of a coding system. It should be noted that the method 700 represents just one implementation and that other implementations are possible within the scope of the embodiments.

Figure 8:
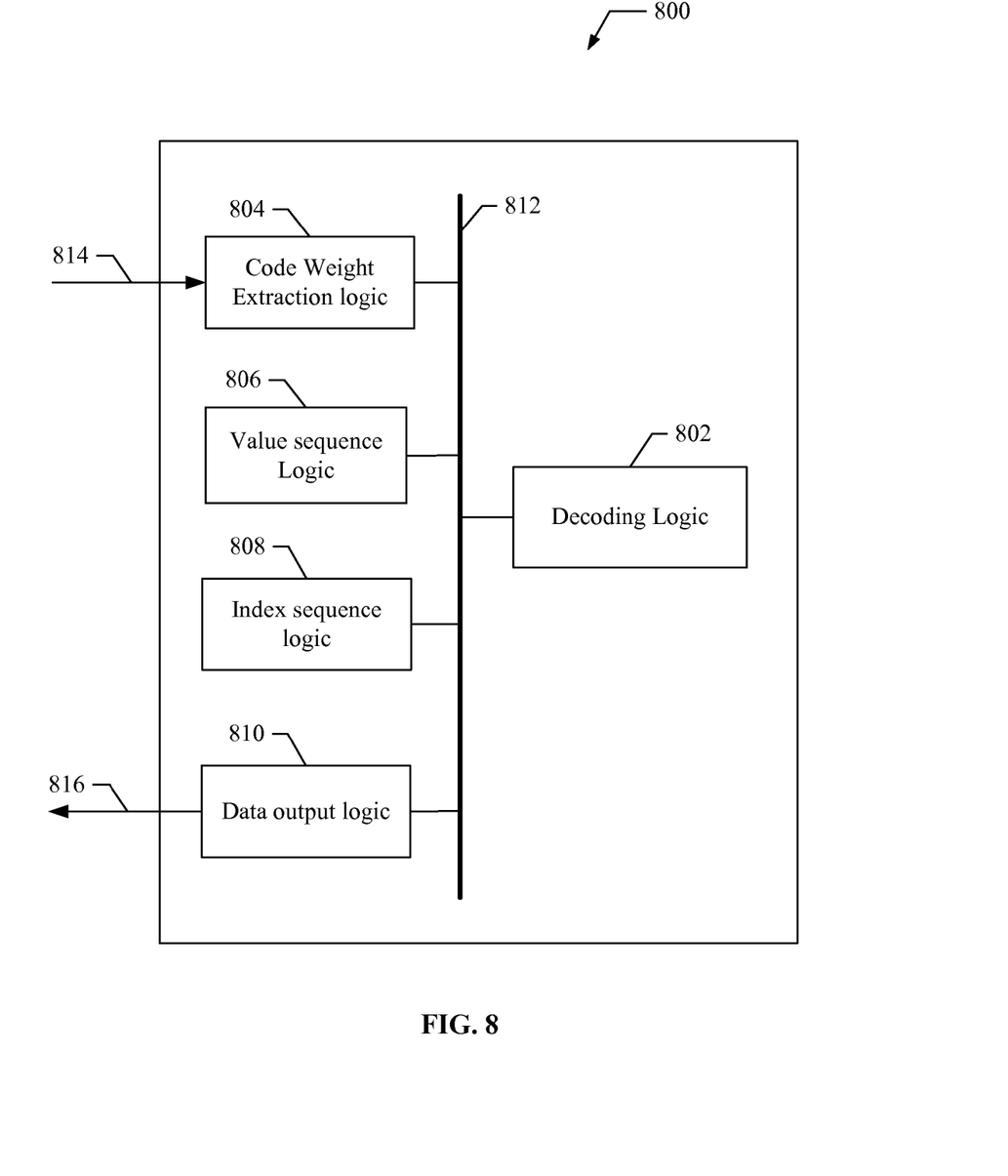
FIG. 8 shows one embodiment of a decoder for use in a embodiments of a coding system.

FIG. 8 shows one embodiment of a decoder 800 suitable for use in a receiving device in embodiments of a coding system. For example, the decoder 800 is suitable for use as the decoder 122 shown in FIG. 1. The decoder 800 comprises decoding logic 802, code weight extraction logic 804, value sequence logic 806, index sequence logic 808, and data output logic 810 all coupled to a data bus 812.

The code weight extraction logic 804 comprises any combination of hardware and/or software and operates to receive a code packet 814 and extract a code weight value from a packet header. For example, in one embodiment, the packet header is formatted as the packet header 400 shown in FIG. 4, and code weight value is the code weight value 406.

The value sequence logic 806 comprises any combination of hardware and/or software and operates to generate a value sequence from a packet header included in the code packet 814. For example, in one embodiment, the packet header is formatted as the packet header 400 shown in FIG. 4, and value sequence is derived from the value sequence type 408 and the value sequence info 412 as described above.

The index sequence logic 808 comprises any combination of hardware and/or software and operates to generate an index sequence from a packet header included in the code packet 814. For example, in one embodiment, the packet header is formatted as the packet header 400 shown in FIG. 4, and index sequence is derived from the index sequence type 410 and the index sequence info 414 as described above.

The decoding logic 802 comprises any combination of hardware and/or software and operates to receive the payload from the code packet 814. The decoding logic 802 also receives one or more of the code weight, value sequence, and index sequence from the code weight extraction logic 804, value sequence logic 806, and index sequence logic 808, respectively. In one embodiment, the decoding logic 802 operates to decode data from the payload by reversing a coding scheme used to encode the data. For example, the code weight, value sequence, and index sequence describe how the data was linearly encoded and the decoding logic 802 operates to reverse the described coding scheme to generate the initial data. The decoding logic 802 may also operate using any suitable technique to recover any lost code packets.

The data output logic 810 comprises any combination of hardware and/or software and operates to receive decoded data from the decoding logic 802 and output this data to other logic at the receiving device using the communication link 816.

In one embodiment, the coding system comprises one or more program instructions ("program instructions") stored on a computer-readable medium, which when executed by at least one processor, for instance, the decoding logic 802, provides the functions described herein. For example, the program instructions may be loaded into the decoder 800 from a computer-readable media, such as a floppy disk, CDROM, memory card, FLASH memory device, RAM, ROM, or any other type of memory device or computer-readable medium that interfaces to the decoder 800. In another embodiment, the instructions may be downloaded into the decoder 800 from an external device or network resource. The program instructions, when executed by the decoding logic 802, provide embodiments of a coding system as described herein.

As a result, embodiments of the coding system operate to receive data and encode the data using a selected linear erasure scheme to produce code packets for transmission over a lossy transmission channel. When received at a receiving device, information from the packet header is extracted for use in decoding the data. Thus, embodiments of the coding system operate to provide a flexible and scalable coding system because the packet header describes the coding scheme for receiving devices. Thus, the receiving devices are able to decode any scheme that may be utilized by reversing the coding scheme described by the packet header.

Figure 9:
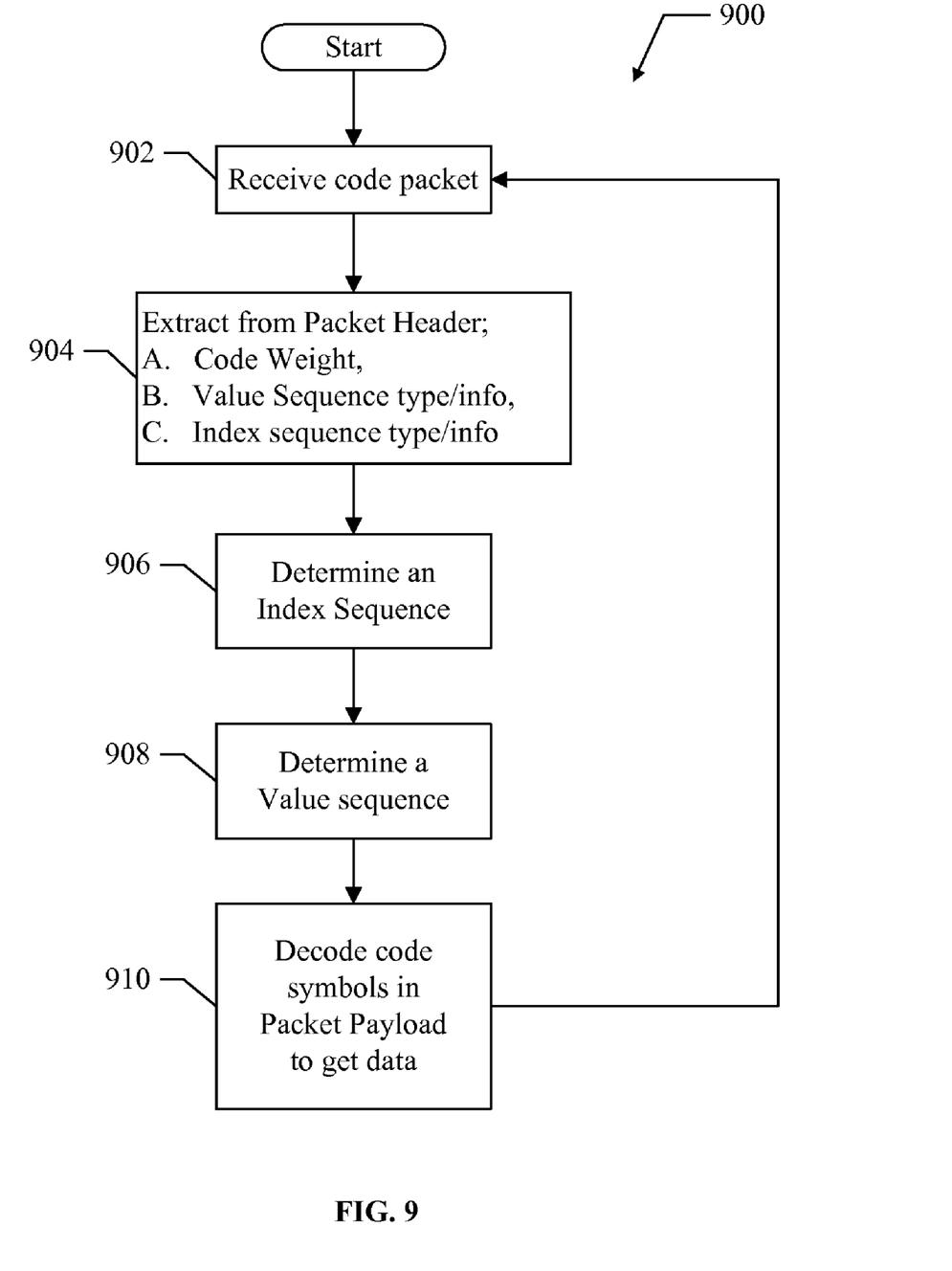
FIG. 9 shows one embodiment of a method for operating a decoder for use in embodiments of a coding system.

FIG. 9 shows one embodiment of a method 900 for operating a decoder in embodiments of a coding system. For clarity, the method 900 is described herein with reference to the decoder 800 shown in FIG. 8. For example, in one embodiment, the decoding logic 802 executes machine-readable instructions to perform the functions described below.

At block 902, code packets are received at a receiving device. For example, the code packets may be received over a wireless transmission channel. In one embodiment, the code packets comprise a packet header and packet payload.

At block 904, information is extracted from the packet header. For example, in one embodiment, the code weight extraction logic 804 operates to extract a code weight parameter from the packet header. The value sequence logic 806 operates to extract value sequence type (408) and value sequence info (410) parameters from the packet header. The index sequence logic 808 operates to extract index sequence type (412) and index sequence info (414) parameters from the packet header.

At block 906, an index sequence is determined. For example, in one embodiment, the index sequence logic 808 operates to process the index sequence type (412) and index sequence info (414) to determine the index sequence.

At block 908, a value sequence is determined. For example, in one embodiment, the value sequence logic 806 operates to process the value sequence type (408) and value sequence info (410) to determine the value sequence.

At block 910, the coded symbols in the code packet payload are decoded. For example, in one embodiment, the decoding logic 802 operates to utilize the index sequence and the value sequence to decode the payload by reversing the encoding process used to encode the original data. As a result, the original data is decoded from the code packet payload. In one embodiment, the decoding logic 802 also operates to use any suitable technique to recover lost code packets. The method then proceeds to block 902 to receive more code packets.

Thus, the method 900 operates to provide one embodiment of a coding system. It should be noted that the method 900 represents just one implementation and that other implementations are possible within the scope of the embodiments.

Figure 10:
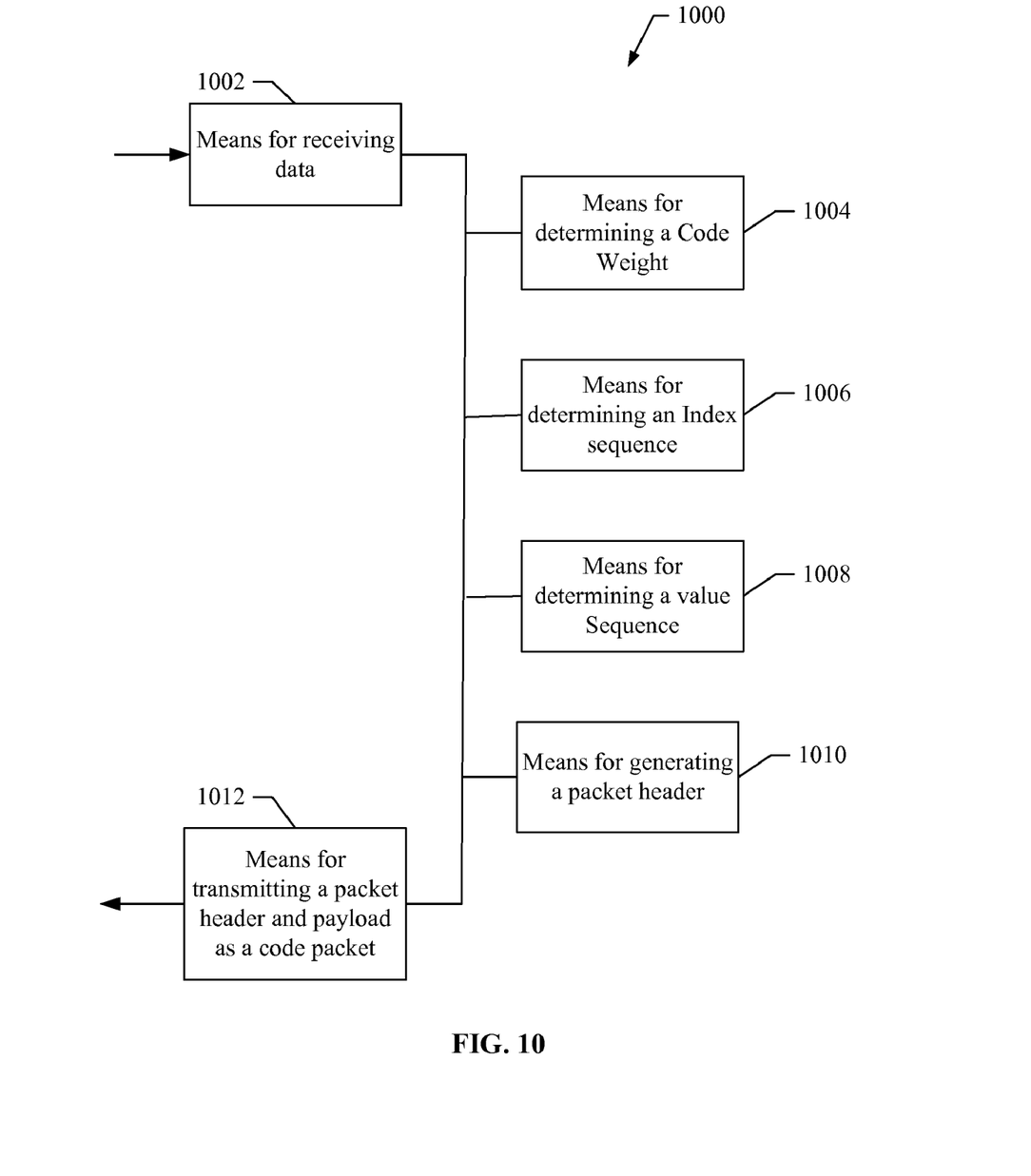
FIG. 10 shows one embodiment of an encoder for use in embodiments of a coding system.

FIG. 10 shows one embodiment of an encoder 1000 for use in embodiments of a coding system. For example, the encoder 1000 is suitable for use as the encoder 114 shown in FIG. 1. The encoder 1000 comprises means for receiving data 1002, means for determining a code weight 1004, means for determining an index sequence 1006, means for determining a value sequence 1008, means for generating a packet header 1010, means for transmitting a packet header and a payload as a code packet 1012. In one or more embodiments, the means 1002 through 1012 comprise at least one processor configured to provide embodiments of a coding system as described herein.

Figure 11:
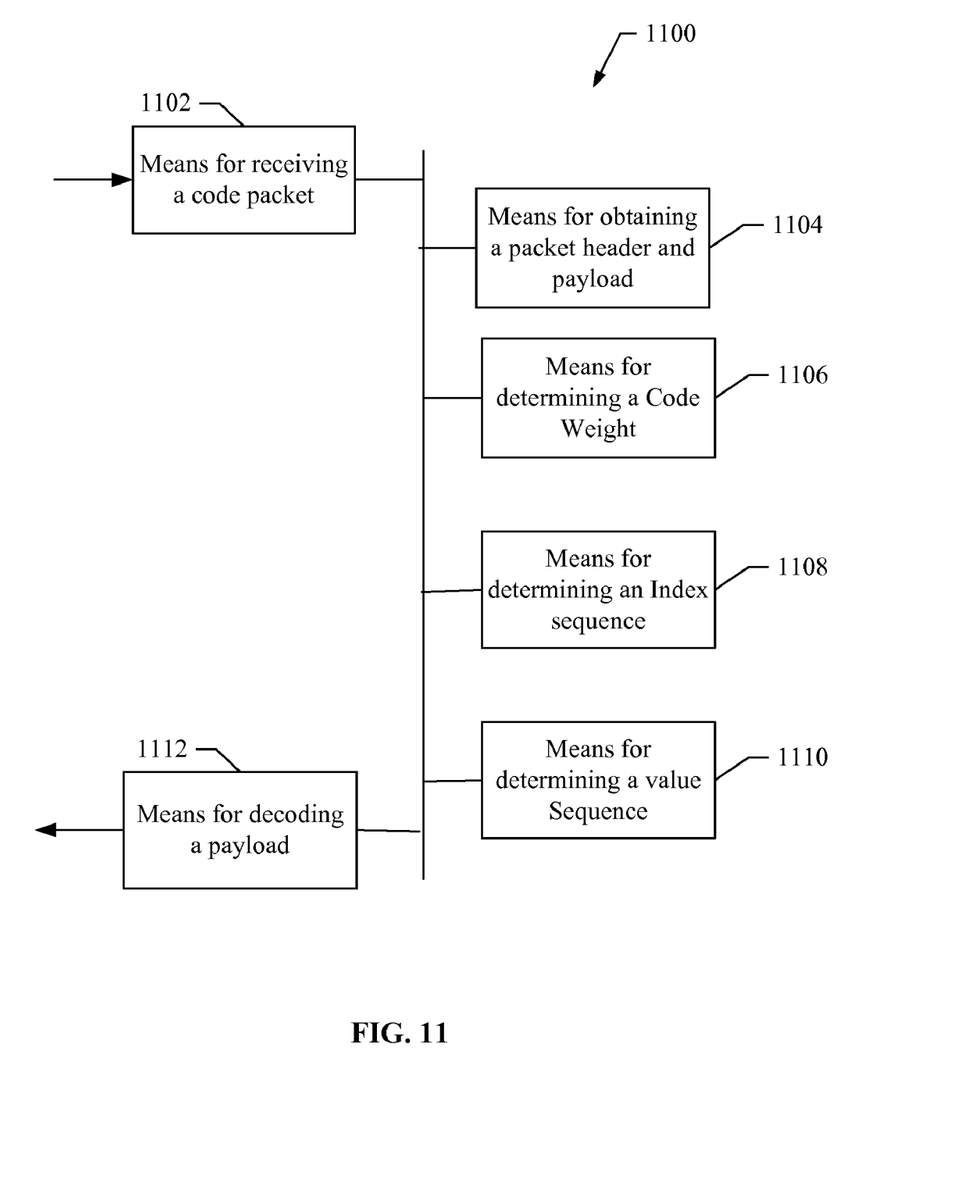
FIG. 11 shows one embodiment of a decoder for use in embodiments of a coding system.

FIG. 11 shows one embodiment of a decoder 1100 for use in embodiments of a coding system. For example, the decoder 1100 is suitable for use as the encoder 122 shown in FIG. 1. The decoder 1100 comprises means for receiving a code packet 1102, means for obtaining a packet header and a payload 1104, means for determining a code weight 1106, means for determining an index sequence 1108, means for determining a value sequence 1110, and means for decoding a payload 1112. In one or more embodiments, the means 1102 through 1112 comprise at least one processor configured to provide embodiments of a coding system as described herein.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed embodiments is provided to enable any person skilled in the art to make or use the present invention. Various modifications to these embodiments may be readily apparent to those skilled in the art, and the generic principles defined herein may be applied to other embodiments, e.g., in an instant messaging service or any general wireless data communication applications, without departing from the spirit or scope of the invention. Thus, the present invention is not intended to be limited to the embodiments shown herein but is to be accorded the widest scope consistent with the principles and novel features disclosed herein. The word "exemplary" is used exclusively herein to mean "serving as an example, instance, or illustration." Any embodiment described herein as "exemplary" is not necessarily to be construed as preferred or advantageous over other embodiments.

Accordingly, while embodiments of a coding system have been illustrated and described herein, it will be appreciated that various changes can be made to the embodiments without departing from their spirit or essential characteristics. Therefore, the disclosures and descriptions herein are intended to be illustrative, but not limiting, of the scope of the invention, which is set forth in the following claims.

What is claimed is:

1. A method for decoding a code packet into a set of data values, the method comprising:
   obtaining a packet header and a packet payload from the code packet;
   determining an index sequence and a value sequence from the packet header; and
   decoding the packet payload based on the index sequence and the value sequence to produce the set of data values.

2. The method of claim 1, further comprising extracting one or more of a code weight parameter, value sequence parameters, and index sequence parameters from the packet header.

3. The method of claim 2, further comprising processing one or more of the code weight parameter, the value sequence parameters, and the index sequence parameters to determine the index sequence and the value sequence.

4. The method of claim 1, wherein said decoding comprises reversing a linear coding scheme described by the index sequence and the value sequence to decode the payload to produce the set of data values.

5. Apparatus for decoding a code packet into a set of data values, the apparatus comprising:
   extraction logic configured to obtain a packet header and a packet payload from the code packet;
   index sequence logic configured to determine an index sequence from the packet header; value sequence logic configured to determine a value sequence from the packet header; and
   decoding logic configured to decode the packet payload based on the index sequence and the value sequence to produce the set of data values.

6. The apparatus of claim 5, further comprising logic configured to extract one or more of a code weight parameter, value sequence parameters, and index sequence parameters from the packet header.

7. The apparatus of claim 6, further comprising logic configured to process one or more of the code weight parameter, the value sequence parameters, and the index sequence parameters to determine the index sequence and the value sequence.

8. The apparatus of claim 5, wherein said decoding logic is configured to reverse a linear coding scheme described by the index sequence and the value sequence to decode the payload to produce the set of data values.

9. Apparatus for decoding a code packet into a set of data values, the apparatus comprising:
   means for obtaining a packet header and a packet payload from the code packet;
   means for determining an index sequence and a value sequence from the packet header; and
   means for decoding the packet payload based on the index sequence and the value sequence to produce the set of data values.

10. The apparatus of claim 9, further comprising means for extracting one or more of a code weight parameter, value sequence parameters, and index sequence parameters from the packet header.

11. The apparatus of claim 10, further comprising means for processing one or more of the code weight parameter, the value sequence parameters, and the index sequence parameters to determine the index sequence and the value sequence.

12. The apparatus of claim 9, wherein said means for decoding comprises means for reversing a linear coding scheme described by the index sequence and the value sequence to decode the payload to produce the set of data values.

13. A computer-readable medium having a computer program, which when executed by at least one processor, operates to decode a code packet to produce a set of data values, the computer program comprising:
   instructions for obtaining a packet header and a packet payload from the code packet;
   instructions for determining an index sequence and a value sequence from the packet header; and
   instructions for decoding the packet payload based on the index sequence and the value sequence to produce the set of data values.

14. The computer program of claim 13, further comprising instructions for extracting one or more of a code weight parameter, value sequence parameters, and index sequence parameters from the packet header.

15. The computer program of claim 14, further comprising instructions for processing one or more of the code weight parameter, the value sequence parameters, and the index sequence parameters to determine the index sequence and the value sequence.

16. The computer program of claim 13, wherein said instructions for decoding comprise instructions for reversing a linear coding scheme described by the index sequence and the value sequence to decode the payload to produce the set of data values.

17. At least one processor configured to perform a method for decoding a code packet into a set of data values, the method comprising:

obtaining a packet header and a packet payload from the code packet;

determining an index sequence and a value sequence from the packet header; and decoding the packet payload based on the index sequence and the value sequence to produce the set of data values.

18. The method of claim 17, further comprising extracting one or more of a code weight parameter, value sequence parameters, and index sequence parameters from the packet header.

19. The method of claim 18, further comprising processing one or more of the code weight parameter, the value sequence parameters, and the index sequence parameters to determine the index sequence and the value sequence.

20. The method of claim 17, wherein said decoding comprises reversing a linear coding scheme described by the index sequence and the value sequence to decode the payload to produce the set of data values.

* * * * *